United States Patent
Isaji et al.

(10) Patent No.: US 10,501,637 B2
(45) Date of Patent: Dec. 10, 2019

(54) SILANE-TREATED FORSTERITE FINE PARTICLES AND PRODUCTION METHOD THEREFOR, AND ORGANIC SOLVENT DISPERSION OF SILANE-TREATED FORSTERITE FINE PARTICLES AND PRODUCTION METHOD THEREFOR

(71) Applicant: NISSAN CHEMICAL INDUSTRIES, LTD., Tokyo (JP)

(72) Inventors: Tadayuki Isaji, Sodegaura (JP); Masahiro Hida, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 123 days.

(21) Appl. No.: 15/315,286

(22) PCT Filed: Aug. 6, 2015

(86) PCT No.: PCT/JP2015/072360
§ 371 (c)(1),
(2) Date: Nov. 30, 2016

(87) PCT Pub. No.: WO2016/021688
PCT Pub. Date: Feb. 11, 2016

(65) Prior Publication Data
US 2017/0190916 A1    Jul. 6, 2017

(30) Foreign Application Priority Data
Aug. 7, 2014  (JP) ................ 2014-161787

(51) Int. Cl.
| | | |
|---|---|---|
| *B32B 5/16* | (2006.01) | |
| *C09C 3/12* | (2006.01) | |
| *C01B 33/22* | (2006.01) | |
| *C09D 17/00* | (2006.01) | |
| *C09C 1/28* | (2006.01) | |

(52) U.S. Cl.
CPC ............... *C09C 3/12* (2013.01); *C01B 33/22* (2013.01); *C09C 1/28* (2013.01); *C09D 17/00* (2013.01)

(58) Field of Classification Search
CPC ...... C01B 33/22; C09C 3/12; G03G 9/09708; G03G 9/09725

USPC ........................................... 428/403
See application file for complete search history.

(56) References Cited

U.S. PATENT DOCUMENTS

| | | | |
|---|---|---|---|
| 4,187,115 A | 2/1980 | Reade | |
| 2007/0190443 A1* | 8/2007 | Hagi | .................... G03G 9/0808 430/108.6 |
| 2010/0330490 A1* | 12/2010 | Ieda | ................... G03G 9/09708 430/108.6 |

FOREIGN PATENT DOCUMENTS

| | | |
|---|---|---|
| JP | S58-145614 A | 8/1983 |
| JP | H02-145482 A | 6/1990 |
| JP | H03-167848 A | 7/1991 |
| JP | H07-96165 A | 4/1995 |
| JP | H11-130993 A | 5/1999 |
| JP | 2003-002640 A | 1/2003 |
| JP | 2003-327470 A | 11/2003 |
| JP | 2005-200294 A | 7/2005 |
| JP | 2007-240825 A | 9/2007 |
| JP | 2009-215144 A | 9/2009 |
| JP | 2014-128773 A | 7/2014 |
| TW | 503228 B | 9/2002 |

OTHER PUBLICATIONS

Ambrozewicz et al., Fluoroalkylsilane versus alkylsilane as hydrophobic agents for silica and silicates, J. of Nanomateirals, vol. 2013, Article ID 631938 (Year: 2013).*
Sep. 29, 2015 International Search Report issued in International Patent Application No. PCT/JP2015/072360.
Sasikala et al. Effect of Silane Coupling Agent on the Dielectric and Thermal Properties of DGEBA-fosterite Composites, Journal of Polymer Research, vol. 18, pp. 811-819, 2011.
Shin-Etsu Silicone Silane Coupling Agent., http://www.silicone.jp/catalog/pdf/SilaneCouplingAgents_J.pdf, pp. 1-48, 2015.
Jun. 12, 2018 Office Action issued in Taiwanese Patent Application No. 104125795.
Aug. 7, 2019 Office Action issued in Japanese Patent Application No. 2016-540739.

* cited by examiner

*Primary Examiner* — Hoa (Holly) Le
(74) *Attorney, Agent, or Firm* — Oliff PLC

(57) ABSTRACT

The invention provides silane-treated forsterite microparticles having a specific surface area of 5 to 100 $m^2/g$, wherein 1 to 5 silyl groups are bound to 1 $nm^2$ of the surface area thereof.

16 Claims, No Drawings

SILANE-TREATED FORSTERITE FINE PARTICLES AND PRODUCTION METHOD THEREFOR, AND ORGANIC SOLVENT DISPERSION OF SILANE-TREATED FORSTERITE FINE PARTICLES AND PRODUCTION METHOD THEREFOR

TECHNICAL FIELD

The present invention relates to silane-treated forsterite in finely divided particle form (hereinafter referred to as "forsterite microparticles"), to a production method therefor, to a dispersion of the silane-treated forsterite microparticles in organic solvent (hereinafter referred to as "an organic solvent dispersion of the silane-treated forsterite microparticles"), and to a production method therefor.

BACKGROUND ART

Hitherto, there has been practically employed, as a sealing material for integrated circuits or a similar material, a heat-resistant resin (e.g., epoxy resin) to which an insulating ceramic material (e.g., silica) in microparticle form has been charged. In a trend for enhancement of integration density and capacity, developments have been carried out for producing an insulating material which exhibits low dielectric loss, particularly in a high-frequency region, in order to reduce signal loss in integrated circuits. One promising dielectric ceramic material for use in a microwave region is forsterite (magnesium silicate: $Mg_2SiO_4$), by virtue of its small dielectric loss in a high-frequency region and high insulating performance.

Regarding forsterite, there has been disclosed a method for producing an MgO—$SiO_2$ oxide powder, which method includes mixing and crushing $Mg(OH)_2$ powder or MgO powder with an $SiO_2$ powder having a mean primary particle size of 10 μm or less in water; spray-drying the mixture by means of a spray-dryer; firing the mixture at 1,100° C.; and subjecting the mixture to wet-crushing and spray-drying, to thereby yield an MgO—$SiO_2$ oxide powder having a mean primary particle size of 0.05 to 0.15 μm (see, for example, Patent Document 1). There has also been disclosed a method for producing a forsterite powder, which method includes pyrolyzing a liquid mixture at 900° C. through a spray-pyrolysis technique, wherein the liquid mixture is prepared by mixing aqueous magnesium nitrate solution and ethyl silicate solution so as to adjust the mole ratio of magnesium to silicon to 2:1 (see, for example, Patent Document 2). Further, there has been disclosed a method for producing crystalline hollow microbodies, the method including transforming a solution of an inorganic material in a hollow microbody form or a precursor thereof in a liquid medium, or a dispersion of the inorganic material or a precursor thereof in a liquid medium into a micro-drop material; and feeding the inorganic material into a high-temperature atmosphere where the microdrop-form inorganic material is sintered or melted (see, for example, Patent Document 3). Meanwhile, there has been known a hydrophobicing surface treatment of forsterite with an agent such as silicone oil or a silane coupling agent (see, for example, Patent Document 4).

PRIOR ART DOCUMENTS

Patent Documents

Patent Document 1: Japanese Patent Laid-Open (kokai) No. 2003-327470

Patent Document 2: Japanese Patent Laid-Open (kokai) No. 2003-2640

Patent Document 3: Japanese Patent Laid-Open (kokai) No. Hei 7-96165

Patent Document 4: Japanese Patent Laid-Open (kokai) No. 2007-240825

SUMMARY OF THE INVENTION

Problems to be Solved by the Invention

However, in any case of Patent Documents 1 to 3, forsterite microparticles fail to be dispersed in an organic solvent. In the case where forsterite microparticles serve as a filler added to insulating material, colloidal particles of forsterite must absolutely be dispersed in the organic solvent, from the viewpoints of compatibility of forsterite microparticles with heat-resistant resin and charging density of forsterite microparticles in the heat-resistant resin. However, none of Patent Documents 1 to 3 can satisfy the demand.

In Patent Document 4 (Examples), forsterite (100 parts by mass) was hydrophobicized with slightly excessive silicone oil (20 parts by mass). When this technique is employed, forsterite fails to be chemically surface-hydrophobicized at high efficiency. In addition, a certain unnecessary component originating from the hydrophobicizing agent may remain in the system at high possibility. Thus, target characteristics such as insulation property may fail to be attained, and difficulty is encountered in providing a mode of using such forsterite as a filler suitable for insulating material.

Notably, such problems are involved not only in fillers for insulating materials but also in other uses such as microfillers, various ceramics, and transparent decorative materials.

The present invention has been conceived under such circumstances. Thus, an object of the present invention is to provide silane-treated forsterite microparticles which are useful for various ceramics, transparent decorative materials, electronic parts, etc., which can be used as an insulating material exhibiting low dielectric loss in a high-frequency region when used as an electronic part, and which successfully exhibits an enhanced compatibility with a heat-resistant resin such as epoxy resin and filing density in the resin. Other objects are to provide a production method for the silane-treated forsterite microparticles, to provide an organic solvent dispersion of the silane-treated forsterite microparticles, and to provide a production method therefor.

Means for Solving the Problems

In one mode of the present invention for attaining the aforementioned objects, there is provided silane-treated forsterite microparticles, characterized in that the forsterite microparticles have a specific surface area of 5 to 100 m²/g, and 1 to 5 silyl groups are bound to 1 nm² of the surface area thereof.

Preferably, the silyl groups are represented by the following formula (1):

$$—Si(R^1)_n(X)_{3-n} \qquad (1)$$

(wherein $R^1$ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5; X represents at least one of a hydroxyl group and a C1 to C4 alkoxy group; and n is an integer of 0 to 3).

In another mode of the present invention for attaining the aforementioned objects, there is provided an organic solvent dispersion of silane-treated forsterite microparticles, characterized in that the dispersion comprises any of the aforementioned silane-treated forsterite microparticles, and a dispersion medium containing an organic solvent.

Preferably, the dispersion medium containing an organic solvent has a solubility parameter (SP) of 8 to 15.

Preferably, the organic solvent is at least one member selected from the group consisting of methyl alcohol (SP=14.5), ethyl alcohol. (SP=12.7), isopropyl alcohol (SP=11.5), dimethylformamide (SP=12.0), methylcellosolve (SP=11.4), ethylcellosolve (SP=9.9), butylcellosolve (SP=8.9), ethylene glycol (SP=14.6), propylene glycol monomethyl ether (SP=10.5), propylene glycol monomethyl ether acetate (SP=8.7), 1-pentanol (SP=11.0), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8).

Preferably, the organic solvent dispersion has a water content of 5 mass % or less.

In still another mode of the present invention for attaining the aforementioned objects, there is provided a method for producing an organic solvent dispersion of silane-treated forsterite microparticles, characterized in that the method comprises the following steps (a) and (b):

Step (a): a step of wet-crushing forsterite microparticles having a specific surface area of 5 to 100 m²/g in a dispersion medium containing an organic solvent by means of a bead mill, to thereby prepare an organic solvent dispersion; and Step (b): a step of adding, to the organic solvent dispersion prepared in step (a), an organic silicon compound represented by the following formula (2):

$$\mathrm{Si}(R^1)_n(X)_{4-n} \qquad (2)$$

(wherein $R^1$ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5; X represents at least one of a hydroxyl group and a C1 to C4 alkoxy group; and n is an integer of 0 to 3) and/or a hydrolyzate thereof, so that the ratio by mass of organic silicon compound to forsterite microparticles (organic silicon compound/forsterite microparticles) is adjusted to 0.01 to 0.50, to thereby bind silyl groups represented by the following formula (1):

$$-\mathrm{Si}(R^1)_n(X)_{3-n} \qquad (1)$$

(wherein $R^1$, X, and n have the same meanings as defined above) onto the surfaces of the forsterite microparticles.

Preferably, the dispersion medium containing an organic solvent has a solubility parameter (SP) of 8 to 15.

Preferably, the organic solvent is at least one member selected from the group consisting of methyl alcohol (SP=14.5), ethyl alcohol (SP=12.7), isopropyl alcohol (SP=11.5), dimethylformamide (SP=12.0), methylcellosolve (SP=11.4), ethylcellosolve (SP=9.9), butylcellosolve (SP=8.9), ethylene glycol (SP=14.6), propylene glycol monomethyl ether (SP=10.5), propylene glycol monomethyl ether acetate (SP=8.7), 1-pentanol (SP=11.0), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8).

Preferably, the production method further includes the following step (c):

step (c): a step of substituting at least a part of the dispersion medium in the organic solvent dispersion produced in step (b), by another organic solvent.

Preferably, the organic solvent dispersion has a water content of 5 mass % or less.

In still another mode of the present invention for attaining the aforementioned objects, there is provided a method for producing silane-treated forsterite microparticles, characterized in that the method comprises the following steps (A) and (B):

Step (A): a step of producing an organic solvent dispersion of silane-treated forsterite microparticles through any of the aforementioned production methods; and Step (B): a step of removing the dispersion medium contained in the organic solvent dispersion.

In still another mode of the present invention for attaining the aforementioned objects, there is provided an electric wire coating material, characterized by containing the aforementioned silane-treated forsterite microparticles.

In still another mode of the present invention for attaining the aforementioned objects, there is provided an insulating coating material, characterized by containing the aforementioned silane-treated forsterite microparticles.

In still another mode of the present invention for attaining the aforementioned objects, there is provided an insulator, characterized by containing the aforementioned silane-treated forsterite microparticles.

In still another mode of the present invention for attaining the aforementioned objects, there is provided an electron tube part, characterized by containing the aforementioned silane-treated forsterite microparticles.

In still another mode of the present invention for attaining the aforementioned objects, there is provided a circuit component substrate, characterized by containing the aforementioned silane-treated forsterite microparticles.

In still another mode of the present invention for attaining the aforementioned objects, there is provided a semiconductor package, characterized by containing the aforementioned silane-treated forsterite microparticles.

Effects of the Invention

According to the present invention, in the case where the silane-treated forsterite microparticles or the organic solvent dispersion thereof serves as a filler added to insulating material, compatibility of the forsterite microparticles with a heat-resistant resin (e.g., epoxy resin) and charging density of forsterite microparticles in the heat-resistant resin can be enhanced. In addition, the silane-treated forsterite microparticles of the present invention or an organic solvent dispersion thereof can be suitably employed as a high-refractive-index coating agent, an anti-reflective agent, and a microfiller for a composite material such as metal, plastic, or ceramic. Furthermore, when the silane-treated forsterite microparticles or the organic solvent dispersion thereof is employed for producing a sintered dielectric ceramic material for use in a microwave region, the sintering temperature for producing the material can be lowered. Particularly in the case when the forsterite microparticles are used in combination with a glass component, the glass component can be simultaneously fired with an Ag-based conductor having low electric resistance at low temperature (e.g., 900° C.). Also, a substrate having a low tangent loss (tan δ) can be produced at low firing temperature. Thus, a substrate which can sufficiently adapt for a high-frequency circuit can be provided.

In addition, the present invention can suitably provide silane-treated forsterite microparticles and an organic solvent dispersion thereof that are useful in variety of ceramic products, transparent decorative materials, and electronic parts (e.g., an electric wire coating material, an insulating coating material, an insulator, an electronic tube part, a circuit component substrate, and a semiconductor package). When they are used in electronic parts, the materials can be used as an insulating material which exhibits low dielectric loss in a high-frequency region. The present invention can suitably produce silane-treated forsterite microparticles and an organic solvent dispersion thereof, which can provide enhanced compatibility of forsterite microparticles with heat-resistant resin and charging density of forsterite microparticles in the heat-resistant resin. Particularly, a composite material of heat-resistant resin (e.g., epoxy resin) prepared with the silane-treated forsterite microparticles of the invention or the organic solvent dispersion thereof can be positively and suitably used as, for example, as a printed circuit substrate material for producing high-frequency apparatuses and information processors (typically satellite broadcasting apparatuses). Furthermore, a composite material of a heat-resistant resin with the silane-treated forsterite microparticles of the invention or the organic solvent dispersion thereof can be used in a wide range of uses, which include semiconductor packaging components (e.g., chip carriers and pin grid arrays), base components (e.g., a resistor, a switch, a capacitor, and a photosensor), and mechanical parts (e.g., IC sockets and connectors). Furthermore, the present invention can also be applied to a container for use in a microwave oven.

MODE FOR CARRYING OUT THE INVENTION

Hereinafter, specific embodiments of the present invention (e.g., the silane-treated forsterite microparticles, the production method therefor, organic solvent dispersion of silane-treated forsterite microparticles, and the production method therefor) will be described in detail. However, these embodiments are given merely for an illustration purpose and can be modified freely, within the scope of the present invention.

An embodiment of the silane-treated forsterite microparticles (hereinafter may be abbreviated as an embodiment of the microparticles) has a specific surface area of 5 to 100 m$^2$/g, wherein 1 to 5 silyl groups are bound to 1 nm$^2$ of the surface area thereof. The microparticles according to the embodiment may be produced through wet-crushing forsterite microparticles by means of a bead mill, to thereby prepare forsterite microparticles, and OH groups present on the surfaces of the forsterite microparticles are treated with a silane (i.e., hydrophobicization).

Forsterite exhibits small dielectric loss in a high-frequency region and high insulating performance and has high breakdown voltage. As used herein, "forsterite" refers to magnesium silicate ($Mg_2SiO_4$). However, "forsterite" also encompasses a compound mainly formed of $Mg_2SiO_4$, so long as the compound exhibits the aforementioned properties attributed to foresterite. That is, compounds other than forsterite may include magnesium silicate-based compounds other than $Mg_2SiO_4$ in accordance with use or the like of the microparticles of the embodiment, so long as the gist of the present invention is not changed.

The microparticles of the embodiment have a specific surface area of 5 to 100 m$^2$/g. When the specific surface area is smaller than the lower limit of the range (i.e., the particle size is too large), characteristics of the microparticles fail to be attained. For example, the microparticles cannot be dispersed in a dispersion medium containing an organic solvent, which is disadvantageous. When the specific surface area is greater than the upper limit of the range (i.e., the particle size is too small), the amount of silane coupling agent for use in silane treatment of the microparticles increases, which is not practical. Also, excess effort is required for wet-crushing of the forsterite compound.

As used herein, the term "specific surface area" refers to the surface area per unit mass of the silane-treated forsterite microparticles. Notably, the specific surface area may be determined through, for example, the nitrogen adsorption method.

In the embodiment, the number of silyl groups bound to 1 nm$^2$ of the surface area of the microparticles is 1 to 5. When the number of silyl groups is smaller than the lower limit of the range, the surfaces of the forsterite microparticles fail to be completely hydrophobicized in wet-crushing of the microparticles by means of a bead mill. As a result, the effect of silane treatment on hydrophobicizing cannot fully be attained. From the viewpoint of the specific surface area, difficulty is encountered in binding 6 or more silyl groups (per surface area) to the surfaces of the forsterite microparticles.

Therefore, in the microparticles of the embodiment, the number of silyl groups bound to 1 nm$^2$ of the surface area of the microparticles is preferably 1 to 3, more preferably 2 to 3. When the number of bound silyl groups falls within the range(s), the effect of silane treatment on hydrophobicizing can be suitably attained. In addition, in an optionally performed subsequent step in which an organic solvent dispersion of the microparticles of the embodiment is prepared, the hydrophobicity of the microparticles can be further enhanced through substituting the organic solvent by another organic solvent. Notably, in the below-mentioned Comparative Examples in which the hydrophobicized forsterite microparticles of the embodiment are not used, sedimentation of microparticles occurs for passage of a certain period in organic solvent substitution, thereby failing to maintain a dispersion state.

The aforementioned bonding state of silyl groups to forsterite microparticles can be efficiently attained when a silane coupling agent is used at a specific ratio (i.e., 1 to 5 silyl groups are bound to 1 nm$^2$ of the surface area thereof). In contrast, when a hydrophobicizing agent is added to the forsterite microparticles in an excessive amount with respect to the forsterite microparticles, undesired polymerization of the agent or other unintentional reactions may occur, thereby possibly reducing hydrophobicization. Also, some undesired components originating from the treatment agent tend to remain, which is not preferred.

As used herein, the "the number of silyl groups bound to the surface area of the microparticles" refers to the number of the silyl groups chemically bound to the surface area of the microparticles. Thus, for example, when an agent for hydrophobicization is merely physically adsorbed on the surfaces of the forsterite microparticles, such an agent is excluded from the number of silyl groups bound to the surface area of the microparticles. The adsorption of such a mode tends to occur, when an excessive amount of a hydrophobicizing agent is added to forsterite microparticles. Therefore, according to the above embodiment, the silane coupling agent is preferably added to forsterite microparticles at such an appropriate ratio that 1 to 5 silyl groups are bound to 1 nm$^2$ of the surface area thereof. Notably, the number of silyl groups bound to 1 nm$^2$ of the surface area of the silane-treated forsterite microparticles may be determined through, for example, ICP photoemission spectroscopy or CHN element analysis.

In the microparticles of the embodiment, the silyl groups are represented by the following formula (1):

$$—Si(R^1)_n(X)_{3-n} \tag{1}$$

(wherein R$^1$ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5; X represents at least one of a hydroxyl group and a C1 to C4 alkoxy group; and n is an integer of 0 to 3).

In the above formula (1), R$^1$ has a solubility parameter of 5.5 to 11.5. Generally, the smaller the difference between R$^1$s, the greater the solubility. Thus, by adjusting the solubility parameter to fall within the above range, dispersion of forsterite microparticles in a dispersion medium containing an organic solvent can be facilitated.

The solubility parameter (SP), estimated through the Fedors method, is calculated by, for example, the following formula:

$$\text{solubility parameter } (\delta)=(Ev/v)^{1/2}=(\Sigma \Delta ei/\Delta vi)^{1/2}$$

(Ev: evaporation energy, v: molar volume, Δei: evaporation energy of atoms or atomic group of component i, and Δvi: molar volume of atoms or atomic group of component i).

The evaporation energy and molar volume of atoms or atomic group employed in calculation of solubility parameter may be obtained with reference to R. F. Fedors, Polym. Eng. Sci., 14, 147 (1974). Needless to say, these values may be derived from another method, so long as the gist of the present invention is not changed.

From the viewpoint of solubility in a dispersion medium containing an organic solvent, the alkyl group in formula (1) is preferably a C1 to C30 group, more preferably a C1 to C18 group. Specific examples include methyl, ethyl, propyl, isopropyl, hexyl, t-butyl, sec-butyl, decyl, dodecyl, and octadecyl.

The aryl group in formula (1) is, for example, phenyl or naphthyl. From the viewpoint of solubility in a dispersion medium containing an organic solvent, the aryl group is preferably phenyl.

R$^1$ is a substituted or unsubstituted group. No particular limitation is imposed on the substituent which R$^1$ may possess. Examples of the substituent include a halogen atom (e.g., fluorine, chlorine, or bromine), a hydroxyl group, a mercapto group, a carboxyl group, an epoxy group, an alkyl group (e.g., methyl, ethyl, isopropyl, propyl, or t-butyl), an aryl group (e.g., phenyl or naphthyl), an aromatic heterocyclic group (e.g., furyl, pyrazolyl, or pyridyl), an alkoxy group (e.g., methoxy, ethoxy, or isopropoxy), an aryloxy group (e.g., phenoxy), an alkenyl group (e.g., vinyl or 1-propenyl), an acyloxy group (e.g., acetoxy, acryloyloxy, or methacryloyloxy), an alkoxycarbonyl group (e.g., methoxycarbonyl or ethoxycarbonyl), an aryloxycarbonyl group (e.g., phenoxycarbonyl), a carbamoyl group (e.g., carbamoyl or N-methylcarbamoyl), and acylamino group (e.g., acetylamino, benzoylamino, acrylamino, or methacrylamino). These substituents may be further substituted.

The X in formula (1) is a hydrolyzable group, which is, for example, at least one of a hydroxyl group and a C1 to C4 alkoxy group. Examples of the alkoxy group include methoxy, ethoxy, propoxy, and butoxy. In formula (1), n is preferably 1 or 2, with 1 being particularly preferred.

In the above silyl groups, all the silyl groups are not necessarily the same groups, and a plurality of R$^1$, X, and n may be different from one another. In the case where different R$^1$s are present, a substantial solubility parameter of R$^1$ can be determined in accordance with the compositional proportions of the groups included in R$^1$. The solubility parameter is 5.5 to 11.5. Thus, so long as the gist of the present invention is not changed, and solubility parameter falls within a range of 5.5 to 11.5, any group having a solubility parameter falling outside the range of 5.5 to 11.5 may also be included in R$^1$.

An embodiment of the organic solvent dispersion of silane-treated forsterite (hereinafter may be abbreviated as the organic solvent dispersion of the embodiment) is formed from the aforementioned silane-treated forsterite microparticles and a dispersion medium containing an organic solvent.

Among these components, the silane-treated forsterite microparticles of the aforementioned embodiment may be used as the silane-treated forsterite microparticles. Within the scope of the present invention, the dispersion may further contain any microparticles other than the silane-treated forsterite microparticles in accordance with use of the organic solvent dispersion or for other reasons.

The dispersion medium containing an organic solvent preferably has a solubility parameter of 8 to 15. In the case where the dispersion of the silane-treated forsterite microparticles is blended with a heat-resistant resin such as an epoxy resin, the solubility parameter is preferably almost the same as that of the heat-resistant resin. Through use of the dispersion medium having a solubility parameter falling within the aforementioned range, dispersion of forsterite colloidal particles in the dispersion medium can be facilitated, and the particles can be suitably charged into the heat-resistant resin. Thus, such a dispersion can be readily used as a microfilter for composite material, and in ceramic products, translucent decorative materials, etc. The dispersion is particularly advantageous for use as a filler for insulating materials.

Examples of the organic solvent having a solubility parameter of 8 to 15 include methyl alcohol (SP=14.5), ethyl alcohol (SP=12.7), isopropyl alcohol (SP=11.5), dimethylformamide (SP=12.0), methylcellosolve (SP=11.4), ethylcellosolve (SP=9.9), butylcellosolve (SP=8.9), ethylene glycol (SP=14.6), propylene glycol monomethyl ether (SP=10.5), propylene glycol monomethyl ether acetate (SP=8.7), 1-pentanol (SP=11.0), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8). However, the organic solvent is not limited to the above examples, and such solvents may be used singly or in combination of two or more species.

The dispersion medium may contain water. Examples of water include pure water and ultra-pure water, and specific examples thereof include ion-exchange water, ultrafiltered water, reverse osmosis water, and distilled water. These water species may be appropriately chosen in accordance with use and the like of the organic solvent dispersion of the embodiment. For example, in production of a high-purity organic solvent dispersion for electronic materials, pure water and ultra-pure water having a considerably low impurity level are preferably used. However, water is not limited to the above examples, and such water species may be used singly or in combination of two or more species.

The organic solvent dispersion of the embodiment preferably has a water content of 5 mass % or lower. When the water content falls within the range, miscibility of the dispersion with heat-resistant resin is not impaired. Thus, the dispersion can be suitably mixed with a heat-resistant resin (e.g., epoxy resin).

The ratio by amount of the organic solvent dispersion of the embodiment to the total metal oxides contained in the silane-treated forsterite microparticles is 0.1 to 50 mass %, preferably 1 to 30 mass %. When the ratio of the organic solvent dispersion amount to the total metal oxide amount is greater than the upper limit, the dispersion medium becomes excessive with respect to forsterite ($Mg_2SiO_4$), whereas when the ratio of the organic solvent dispersion amount to the total metal oxide amount is smaller than the lower limit, the dispersion medium becomes deficient with respect to forsterite ($Mg_2SiO_4$). In the case of such excess or deficiency, the effects of the present invention cannot fully be attained in some uses and the like of the organic solvent dispersion of the embodiment. However, the ratio is not limited to fall within the above ranges, and the ratio with respect to the total metal oxide amount may be elevated to higher than 50 mass %.

Next, an embodiment of the method for producing the microparticles and an embodiment of the method for producing the organic solvent dispersion will be described.

The organic solvent dispersion production method of the embodiment includes the following steps (a) and (b):

Step (a): a step of wet-crushing forsterite microparticles having a specific surface area of 5 to 100 $m^2/g$ in a dispersion medium containing an organic solvent by means of a bead mill, to thereby prepare an organic solvent dispersion; and Step (b): a step of adding, to the organic solvent dispersion prepared in step (a), an organic silicon compound represented by the following formula (2):

$$Si(R^1)_n(X)_{4-n} \quad (2)$$

(wherein $R^1$ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5; X represents at least one of a hydroxyl group and a C1 to C4 alkoxy group; and n is an integer of 0 to 3) and/or a hydrolyzate thereof, so that the ratio by mass of organic silicon compound to forsterite microparticles (organic silicon compound/forsterite microparticles) is adjusted to 0.01 to 0.50, to thereby bind silyl groups represented by the following formula (1):

$$-Si(R^1)_n(X)_{3-n} \quad (1)$$

(wherein $R^1$, X, and n have the same meanings as defined above) onto the surfaces of the forsterite microparticles.

In step (a), the forsterite microparticles having a specific surface area of 5 to 100 $m^2/g$ may be obtained through a method known per se (e.g., a solid phase method or spray pyrolysis). Needless to say, the forsterite microparticles may be produced through another method.

The aforementioned dispersion medium containing an organic solvent may also be used. No particular limitation is imposed on the apparatus employed in wet-crushing by means of a bead mill (hereinafter may be referred to as "bead mill treatment"), and a method technique known per se may be employed. Examples thereof include a ball mill, a sand grinder, and a continuous bead mill.

The forsterite microparticle concentration during bead mill treatment is preferably 1 to 80 mass %, more preferably 10 to 50 mass %. Under such conditions, the surfaces of the forsterite microparticles can be effectively hydrophobicized in a subsequent step (silane treatment). However, the forsterite microparticle concentration during bead mill treatment is not limited to the above examples.

Examples of the compound represented by formula (2) (organic silicon compound) in step (b) include tetramethoxysilane, tetraethoxysilane, tetra(n-propoxy)silane, tetraisopropoxysilane, tetra(n-butoxy)silane, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyl trimethoxysilane, (3,4-epoxycyclohexyl)methyltriethoxysilane, β-(3,4-epoxycyclohexyl)ethyltrimethoxysilane, β-(3,4-epoxycyclohexyl)ethyl triethoxysilane, β-(3,4-epoxycyclohexyl)ethyl tripropoxysilane, β-(3,4-epoxycyclohexyl)ethyl tributoxysilane, β-(3,4-epoxycyclohexyl)ethyl triphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyl dimethoxysilane, glycidoxymethylmethyldiethoxysilane, α-glycidoxyethyl methyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyl dimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, and methylvinyldiethoxysilane. Among them, methyltrimethoxysilane ($R^1$ in formula (1), SP=5.8), phenyltrimethoxysilane ($R^1$ in formula (1), SP=10.3), methyltriethoxysilane ($R^1$ in formula (1), SP=5.8), methacryloxypropyltrimethoxysilane ($R^1$ in formula (1), SP=9.5), and aminopropyltrimethoxysilane ($R^1$ in formula (1), SP=9.9) are preferred.

Examples of the compound represented by formula (2) (a hydrolyzate of an organic silicon compound) include hydrolyzates of the aforementioned organic silicon compounds. Among them, hydrolyzates of methyltrimethoxysilane, phenyltrimethoxysilane, methyltriethoxysilane, and methacryloxypropyltrimethoxysilane are particularly preferred. In the present invention, hydrolyzates of the organic silicon compounds are compounds in which $R^1$ and X in formula (2) are partially or completely substituted by hydrogen atoms. Such hydrolyzates of the organic silicon compounds are formed by adding water to an organic silicon compound and optionally adding thereto an acidic aqueous solution such as aqueous hydrochloric acid, aqueous sulfuric acid, or aqueous acetic acid.

The organic silicon compounds represented by formula (2) and hydrolyzates thereof may be used singly or in combination of two or more species. The organic silicon compounds and hydrolyzates thereof may be used in combination.

Examples of the compound represented by formula (2) which is employed by step (b) are described above. Such a compound represented by formula (2) is added to a hydrophilic organic solvent dispersion of forsterite microparticles produced in step (a), and the forsterite microparticles are aged, whereby silyl groups represented by formula (1) are bound to the surfaces of forsterite microparticles (hydrophobicization). Through such hydrophobicization, hydrophobicity of forsterite microparticles via substitution of organic solvent can be further enhanced in optionally conducted subsequent step (c). In the below-mentioned Comparative Examples in which the hydrophobicized forsterite microparticles of the embodiment are not used, sedimentation of microparticles occurs for passage of a certain period in organic solvent substitution, thereby failing to maintain a dispersion state.

For forming silyl groups represented by formula (1) from the compound represented by formula (2), preferably 1 to 4 moles of water is needed with respect to 1 mole of the organic silicon compound and/or a hydrolyzate thereof. Water may be incorporated in advance into the organic solvent dispersion or may be added after addition of the organic silicon compound.

After addition of the organic silicon compound and/or a hydrolyzate thereof, the forsterite microparticles are aged. Aging may be performed at ambient temperature to the boiling point of a hydrophilic organic solvent employed. From the viewpoint of reactivity of silyl groups, aging is preferably performed at a temperature almost equal to the boiling point of the organic solvent. Aging may be performed under atmospheric conditions but is preferably performed under reflux. Before addition, the organic silicon compound represented by formula (2) may be hydrolyzed in advance.

Through step (b), an organic solvent dispersion of silane-treated forsterite microparticles in which 1 to 5 silyl groups are bound to 1 $nm^2$ of the surface area thereof is produced. The thus-produced hydrophilic organic solvent dispersion preferably has a solid content of 10 to 70 mass % as a total metal oxide concentration attributed to silane-treated forsterite microparticles.

The organic solvent dispersion production method of the embodiment preferably includes the following step (c):

Step (c): a step of substituting at least a part of the dispersion medium in the organic solvent dispersion produced in step (b), by another organic solvent.

In substitution of the dispersion medium by another organic solvent, the temperature of the dispersion medium is room temperature to the boiling point of the substitution organic solvent. The dispersion medium prepared in step (c) has a total metal oxide concentration of 10 to 70 mass %, attributed to silane-treated forsterite microparticles.

No particular limitation is imposed on the substitution organic solvent. Examples include dimethylformamide (SP=12.0), methylcellosolve (SP=11.4), ethylcellosolve (SP=9.9), butylcellosolve (SP=8.9), propylene glycol monomethyl ether (SP=10.5), propylene glycol monomethyl ether acetate (SP=8.7), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8). These dispersion medium-substitution organic solvents may be used singly or in combination of two or more species.

When the organic solvent dispersion of the embodiment has great water content, solubility with respect to a heat-resistant resin (e.g., epoxy resin) may be impaired in the case where the solvent is added to the heat-resistant resin. Thus, the organic solvent dispersion of the embodiment preferably has a water content of 5 mass % or lower.

The present invention will next be described in detail by way of Examples and Comparative Examples, which should not be construed as limiting the invention thereto.

EXAMPLES

Determination of Physical Properties

Physical properties were determined through the following methods.

Water Content: determined through Karl Fischer titration.
Particle Size Determined by Dynamic Light Scattering Method: dilution of a dispersion with a dispersion medium, determined by means of a dynamic light scattering-based analyzer (Zetasizer Nano S (product name), product of Malvern) with a solvent parameter.

Specific Gravity: determined by means of a hydrometer (20° C.).
Viscosity: determined by means of a BL viscometer (25° C.)
Specific Surface Area: determined by nitrogen adsorption method.

The number of silyl groups bound to 1 nm$^2$ of the surface area of silane-treated forsterite microparticles was calculated through CHN element analysis.

Production Example 1 (Production of Forsterite Microparticles)

Citric acid monohydrate (product of Showa Denko K.K., 16M, 100 mass %) (252.2 g) was dissolved in pure water (2058.2 g), to thereby prepare 10.0 mass % aqueous citric acid. Magnesium hydroxide (product of Ube material Industries, UD-653, MgO content: 65.7 mass %) (108.3 g) was added to the thus-prepared aqueous citric acid under stirring, and the mixture was stirred at room temperature for 1 hour, to thereby prepare aqueous magnesium citrate. The thus-prepared aqueous magnesium citrate was found to have a solid content (as reduced to MgO) of 3.0 mass %.

To colloidal silica (Snowtex(registered trademark) OXS, product of Nissan Chemical Industries, silica concentration: 10.6 mass %, primary particle size (determined by electron microscopic observation): 5 nm) (425.2 g), pure water (190.9 g) was added, and the aforementioned aqueous magnesium citrate (2022.4 g) was added. The mixture was stirred at room temperature for 30 minutes. The resultant liquid mixture (2,639 g) wad dried by means of a spray drier (Pulvis Mini Spray GA-22, product of Yamato Scientific Co., Ltd.) under the following conditions: inlet temperature of 180° C., atomizing air pressure of 1.35 kgf/cm$^2$, aspirator flow of 0.30 m$^3$/min, and liquid feed speed of 5 g/min. The outlet temperature of the spray drier was 80±2° C. The above procedure was repeatedly performed twice, to thereby yield 407.5 g (in total) of a dry white powder.

The thus-obtained dry powder (185 g) was put into a crucible and fired in air at 500° C. for 2 hours by means of an electric furnace. Subsequently, firing was further performed in air at 800° C. for 2 hours. The above firing operation was repeatedly performed twice, to thereby yield 108.9 g (in total) of a white powder. The obtained white powder was characterized through X-ray diffractometry. As a result, the formed phase was found to be substantially a forsterite single phase. The specific surface area of the powder, as determined through the nitrogen adsorption method, was 15.5 m$^2$/g.

Example 1

To the forsterite microparticles produced in Production Example 1 (99 g), zirconia beads (particle size: 1 mm) (1,240 g) and isopropanol (231 g) were added. The mixture was subjected to a ball mill treatment for 45 hours, and the beads were removed, to thereby prepare a slurry (337 g) of forsterite microparticles. The forsterite microparticle slurry was found to have a solid content of 28.4 mass % (after firing at 300° C.). Subsequently, isopropanol (139 g) was added to the forsterite microparticle slurry (332 g), and the mixture was subjected to wet-crushing with beads mill by means of a continuous wet-crushing machine (Ultra Apex Mill UAM015, product of Kotobuki Kogyo). The used beads were zirconia beads (particle size: 0.05 mm), and crushing was performed at a peripheral speed of 10 m/s and a circulation flow of 100 mL/min, for 1 hour. After completion of wet-crushing, the product was allowed to stand for 30 hours, and uncrushed matter was removed, to thereby yield an isopropanol dispersion (367 g) of forsterite microparticles. The isopropanol dispersion of forsterite microparticles was found to have a solid content of 12.2 mass % and a water content of 0.7 mass %. The dry powder obtained by drying the slurry at 300° C. for 1 hour was found to have a specific surface area of 21.0 m$^2$/g.

The thus obtained isopropanol dispersion (246.3 g) of forsterite microparticles was placed in a 500-mL egg-plant-shaped flask. Then, water (0.85 g) and 3-methacryloxypropyltrimethoxysilane (KBM-503, product of Shin-Etsu Chemical Co., Ltd.) (0.78 g), serving as a silane coupling agent, were added to the flask (i.e., three 3-methacryloxypropyltrimethoxysilane molecules/1 nm$^2$ surface area of the forsterite microparticles). The mixture was heat-refluxed in an oil bath for 5 hours, to thereby yield 143 g of an isopropanol dispersion of silane-treated forsterite microparticles. The thus-obtained isopropanol dispersion was found to have a water content of 0.5 mass %, a particle size determined by dynamic light scattering of 313 nm, a specific gravity of 0.938, and a viscosity of 4.6 mPa·s. The slurry was found to have a solid content of 21.3 mass % (after firing at 800° C.)

Example 2

The isopropanol dispersion (118 g) of silane-treated forsterite microparticles, produced in Example 1, was distilled by means of an evaporator at 150 Torr, to thereby remove isopropanol, while methyl ethyl ketone (3.3 L) was added to the evaporator. As a result, isopropanol was substituted by methyl ethyl ketone, to thereby yield a methyl ethyl ketone dispersion (131 g) of silane-treated forsterite microparticles. The thus-obtained methyl ethyl ketone dispersion was found to have a water content of 0.1 mass %, a particle size determined by dynamic light scattering of 180 nm, a specific gravity of 0.912, and a viscosity of 0.8 mPa·s. The slurry was found to have a solid content of 15.4 mass % (after firing at 800° C.)

The thus-obtained silane-treated forsterite methyl ethyl ketone dispersion was dried on a hot plate maintained at 130° C. and further dried in vacuum at 100° C. The thus-dried powder was crushed by means of an alumina mortar so as to reduce the particle size and dried again at 150° C. for about 10 hours. The dielectric constant and dielectric tangent of the dry powder of silane-treated forsterite microparticles were determined by means of a specific apparatus (Vector Network Analyzer Anritsu 37225C, product of Keycom Corp.) through a perturbation-mode oscillation method under the following conditions: test frequency of 1 GHz or 10 GHz, test temperature of about 24° C., humidity of about 45%, and number of trials of 3. The silane-treated forsterite had a dielectric constant of 10.3 (@1 GHz) and 7.7 (@10 GHz) and a dielectric tangent (tan δ) of 0.005 (@1 GHz) and 0.007 (@10 GHz). Generally, dielectric tangent is known to be impaired by reducing the particle size of forsterite particles. However, according to the present invention, the dielectric tangent remained lower than 0.01 in a high-frequency region (1 GHz or 10 GHz). That is, dielectric loss was small in a high-frequency region. Thus, the silane-treated forsterite microparticles are envisaged to be employed as an insulating material or an insulating filler.

Comparative Example 1

The isopropanol dispersion (100 g) of silane-untreated forsterite microparticles, produced in Example 1, was distilled by means of an evaporator at 150 Torr, to thereby remove isopropanol, while methyl ethyl ketone (1.0 L) was added to the evaporator. As a result, isopropanol was substituted by methyl ethyl ketone. However, the reaction was allowed to stand for 1 hour, whereby forsterite microparticles were settled. Thus, no methyl ethyl ketone dispersion of forsterite microparticles was formed.

Example 3

By use of the organic solvent dispersion of silane-treated forsterite microparticles, produced in Example 1, various products employing silane-treated forsterite microparticles were manufactured. In Example 3, an electric wire coating material, an insulating coating material, an insulator, an electron tube part, a circuit component substrate, and a semiconductor package were successfully produced. As described above, the silane-treated forsterite microparticles of the embodiment described in Example 1, an organic solvent dispersion thereof, and the like can be used in, for example, an electronic part, and serve as an insulating material having low dielectric loss in a high-frequency region. In addition, compatibility of the forsterite microparticles with a heat-resistant resin (e.g., epoxy resin) and charging density of forsterite microparticles in the resin can be enhanced. Thus, various properties of such target products are also thought to be enhanced.

In the case where the silane-treated forsterite microparticles were employed in an epoxy resin composite material for electronic parts, the following specific procedure was employed.

To the methyl ethyl ketone dispersion (114.9 g) of silane-treated forsterite microparticles, produced in Example 2, a bisphenol F epoxy resin (YDF-8170C, product of Nippon Steel & Sumikin Chemical Co., Ltd.) (41.3 g) was added, and the mixture was stirred by means of a stirrer for 1 hour. Subsequently, the mixture was subjected to solvent removal by means of an evaporator at 60° C. and 80 Torr for 1 hour and at 60° C. and 30 Torr for 1 hour. The mixture was further subjected to solvent removal, under a flow of nitrogen, at 60° C. and 30 Torr for 30 minutes, to thereby thoroughly remove methyl ethyl ketone. As a result, 59.0 g of a bisphenol F epoxy resin dispersion of silane-treated forsterite microparticles was yielded. The thus-obtained bisphenol F epoxy resin dispersion was found to have a silane-treated forsterite microparticle content of 30.0 mass %. No cohesion, thickening, or the like was observed, indicating that the dispersion had high dispersibility and flowability.

Example 4

To the methyl ethyl ketone dispersion (113.5 g) of silane-treated forsterite microparticles, produced through a technique disclosed in Example 2 (a solid content of 15.6 mass % after firing at 800° C.), a bisphenol F epoxy resin (YDF-8170C, product of Nippon Steel & Sumikin Chemical Co., Ltd.) (26.5 g) was added. The mixture was subjected to the same procedure as that disclosed in Example 3, to thereby yield 44.3 g of a bisphenol F epoxy resin dispersion of silane-treated forsterite microparticles. The thus-obtained bisphenol F epoxy resin dispersion was found to have a silane-treated forsterite microparticle content of 40.0 mass %. No cohesion, thickening, or the like was observed, indicating that the dispersion had high dispersibility and flowability.

Example 5

To the methyl ethyl ketone dispersion (114.2 g) of silane-treated forsterite microparticles, produced through a technique disclosed in Example 2 (a solid content of 15.5 mass % after firing at 800° C.), hexahydrophthalic anhydride (Rikacid MH-700, product of New Japan Chemical Co., Ltd.) (26.5 g) was added. The mixture was subjected to the same procedure as that disclosed in Example 3, to thereby yield 44.3 g of a hexahydrophthalic anhydride dispersion of silane-treated forsterite microparticles. The thus-obtained hexahydrophthalic anhydride dispersion was found to have a silane-treated forsterite microparticle content of 40.0 mass %. A slight rise in viscosity was observed, but no cohesion or the like was observed, indicating high dispersibility of the dispersion.

Example 6

To the bisphenol F epoxy resin dispersion (59.0 g) produced in Examples 3, hexahydrophthalic anhydride (Rikacid MH-700, product of New Japan Chemical Co., Ltd.) (39.2 g) serving as a curing agent was added. The mixture was stirred by means of a stirrer, and then dimethylbenzylamine (0.4 g) serving as a curing accelerator was added thereto (1 mass % with respect to bisphenol F epoxy resin), followed by stirring, to thereby form a varnish. The varnish was defoamed in vacuum and poured into a mold (about 180 mm×about 145 mm×about 1 mm (thickness). The varnish was heated in an oven at 90° C. for 2 hours and 150° C. for 10 hours for curing. The cured product was slowly cooled and removed from the mold, to thereby yield a silane-treated forsterite microparticle/epoxy resin composite. The thus-obtained epoxy resin composite was found to have a silane-treated forsterite microparticle content of 19.0 mass %. No such cohesion of silane-treated forsterite microparticles as observed in the case of bisphenol F epoxy resin dispersion was observed, and a uniform dispersion state was maintained.

The thus-obtained silane-treated forsterite microparticle/epoxy resin composite was subjected to a withstand voltage test in accordance with JIS-C2110-1 or the like by means of a breakdown tester (YST-243WS, product of Yamayoshikenki) under the following conditions: test voltage of 20 kV, test frequency of 200 Hz, test temperature of about 20° C., breakdown detection current of 10 mA, and number of test pieces of 2. The silane-treated forsterite microparticle/epoxy resin composite exhibited a breakdown time of 43.5 hours (average), which is equivalent to or longer than that of a filler-free epoxy resin cured product. Thus, the silane-treated forsterite microparticles of the invention can be applied to an epoxy resin composite with high insulation property for electronic parts.

Comparative Example 2

To methyl ethyl ketone (102.0 g), a commercial, high-purity synthetic forsterite powder (HFF-SO, specific surface area: 8.7 m²/g, product of Marusu Glaze Co., Ltd.) (18.0 g) and a bisphenol F epoxy resin (YDF-8170C, product of Nippon Steel & Sumikin Chemical Co., Ltd.) (42.0 g) were added. The mixture was subjected to the same procedure as that disclosed in Example 3, to thereby yield 60.0 g of a slurry of a bisphenol F epoxy resin dispersion of forsterite powder. To the bisphenol F epoxy resin dispersion, hexahydrophthalic anhydride (Rikacid MH-700, product of New Japan Chemical Co., Ltd.) (39.9 g) serving as a curing agent was added. The resultant mixture was subjected to the same procedure as that disclosed in Example 6 so as to prepare a forsterite powder/epoxy resin composite. However, forsterite powder was settled in a mold during heating by means of an oven. Thus, an epoxy resin composite in uniform dispersion state failed to be produced.

Comparative Example 3

To methyl ethyl ketone (102.0 g), a commercial, fused silica powder (SFP-20M, specific surface area: 11.3 m²/g, product of Denka Co., Ltd.) (18.0 g) and a bisphenol F epoxy resin (YDF-8170C, product of Nippon Steel & Sumikin Chemical Co., Ltd.) (42.0 g) were added. The mixture was subjected to the same procedure as that disclosed in Example 3, to thereby yield 60.0 g of a slurry of a bisphenol F epoxy resin dispersion of fused silica powder. To the bisphenol F epoxy resin dispersion, hexahydrophthalic anhydride (Rikacid MH-700, product of New Japan Chemical Co., Ltd.) (39.9 g) serving as a curing agent was added. The resultant mixture was subjected to the same procedure as that disclosed in Example 6, to thereby prepare a fused silica powder/epoxy resin composite. The thus-obtained epoxy resin composite was found to have a fused silica powder content of 19.0 mass %. Cohesion of fused silica powder was not observed, and a uniform dispersion state was maintained. However, the fused silica powder/epoxy resin composite exhibited a breakdown time, as determined through the same method as employed in Example 6, of 34.9 hours (average), which is shorter than that of a filler-free epoxy resin cured product. Variation in breakdown time measurements was large. Thus, an epoxy resin composite with high insulation property failed to be produced.

The invention claimed is:

1. An organic solvent dispersion of silane-treated forsterite microparticles, the dispersion comprising:
   silane-treated forsterite microparticles having a specific surface area of 5 to 100 m²/g, and having 1 to 5 silyl groups bound to 1 nm² of the surface area thereof; and
   a dispersion medium containing an organic solvent,
   wherein the silyl groups are represented by the following formula (1):

$$-\text{Si}(R^1)_n(X)_{3-n} \quad (1)$$

wherein:
   R¹ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5;
   X represents at least one of a hydroxyl group and a C1 to C4 alkoxy group; and
   n is an integer of 0 to 3.

2. An organic solvent dispersion of silane-treated forsterite microparticles according to claim 1, wherein the dispersion medium containing an organic solvent has a solubility parameter (SP) of 8 to 15.

3. An organic solvent dispersion of silane-treated forsterite microparticles according to claim 1, wherein the organic solvent is at least one member selected from the group consisting of methyl alcohol (SP=14.5), ethyl alcohol (SP=12.7), isopropyl alcohol (SP=11.5), dimethylformamide (SP=12.0), methylcellosolve (SP=11.4), ethylcellosolve (SP=9.9), butylcellosolve (SP=8.9), ethylene glycol (SP=14.6), propylene glycol monomethyl ether (SP=10.5), propylene glycol monomethyl ether acetate (SP=8.7), 1-pentanol (SP=11.0), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8).

4. An organic solvent dispersion of silane-treated forsterite microparticles according to claim 1, wherein the organic solvent dispersion has a water content of 5 mass % or less.

5. An electric wire coating material formed from the organic solvent dispersion of silane-treated forsterite microparticles as recited in claim 1.

6. An insulating coating material formed from the organic solvent dispersion of silane-treated forsterite microparticles as recited in claim 1.

7. An insulator formed from the organic solvent dispersion of silane-treated forsterite microparticles as recited in claim 1.

8. An electron tube part formed from the organic solvent dispersion of silane-treated forsterite microparticles as recited in claim 1.

9. A circuit component substrate formed from the organic solvent dispersion of silane-treated forsterite microparticles as recited in claim 1.

10. A semiconductor package formed from the organic solvent dispersion of silane-treated forsterite microparticles as recited in claim 1.

11. A method for producing the organic solvent dispersion of silane-treated forsterite microparticles according to claim 1, the method comprising the following steps (a) and (b):
    step (a): a step of wet-crushing forsterite microparticles having a specific surface area of 5 to 100 m²/g in a dispersion medium containing an organic solvent by means of a bead mill, to thereby prepare an organic solvent dispersion; and
    step (b): a step of adding, to the organic solvent dispersion prepared in step (a), an organic silicon compound represented by the following formula (2):

$$\text{Si}(R^1)_n(X)_{4-n} \quad (2)$$

(wherein R¹ represents at least one member selected from the group consisting of an alkyl group, an aryl group, a halo-alkyl group, a halo-aryl group, an alkenyl group, an epoxy group, a (meth)acryloyl group, a mercapto group, an amino group, and a cyano group, each of which is substituted or unsubstituted and has a solubility parameter (SP), estimated through the Fedors method, of 5.5 to 11.5; X represents at least one of a hydroxyl group and a C1 to C4 alkoxy group; and n is an integer of 0 to 3) and/or a hydrolyzate thereof, so that the ratio by mass of organic silicon compound to forsterite microparticles (organic silicon compound/forsterite microparticles) is adjusted to 0.01 to 0.50, to thereby bind the silyl groups represented by the formula (1) onto the surfaces of the forsterite microparticles.

12. A method for producing an organic solvent dispersion of silane-treated forsterite microparticles according to claim 11, wherein the dispersion medium containing an organic solvent has a solubility parameter (SP) of 8 to 15.

13. A method for producing an organic solvent dispersion of silane-treated forsterite microparticles according to claim 11, wherein the organic solvent is at least one member selected from the group consisting of methyl alcohol (SP=14.5), ethyl alcohol (SP=12.7), isopropyl alcohol (SP=11.5), dimethylformamide (SP=12.0), methylcellosolve (SP=11.4), ethylcellosolve (SP=9.9), butylcellosolve (SP=8.9), ethylene glycol (SP=14.6), propylene glycol monomethyl ether (SP=10.5), propylene glycol monomethyl ether acetate (SP=8.7), 1-pentanol (SP=11.0), methyl ethyl ketone (SP=9.3), methyl isobutyl ketone (SP=8.3), cyclohexanone (SP=9.8), ethyl acetate (SP=9.1), butyl acetate (SP=8.5), toluene (SP=8.9), methyl methacrylate (SP=9.9), pentaerythritol triacrylate (SP=10.0), dipentaerythritol hexaacrylate (SP=9.1), bisphenol A epoxy resin (SP=10.4), and bisphenol F epoxy resin (SP=10.8).

14. A method for producing an organic solvent dispersion of silane-treated forsterite microparticles according to claim 11, wherein the production method further includes the following step (c):

step (c): a step of substituting at least a part of the dispersion medium in the organic solvent dispersion produced in step (b), by another organic solvent.

15. A method for producing an organic solvent dispersion of silane-treated forsterite microparticles according to claim 11, wherein the organic solvent dispersion has a water content of 5 mass % or less.

16. A method for producing silane-treated forsterite microparticles, the method comprising the following steps (A) and (B):

step (A): a step of producing an organic solvent dispersion of silane-treated forsterite through a production method as recited in claim 11; and step (B): a step of removing the dispersion medium contained in the organic solvent dispersion.

\* \* \* \* \*